US010371420B2

(12) United States Patent
Katoh et al.

(10) Patent No.: US 10,371,420 B2
(45) Date of Patent: Aug. 6, 2019

(54) AIR CONDITIONING DEVICE FOR VEHICLE

(71) Applicant: DENSO CORPORATION, Kariya, Aichi-pref. (JP)

(72) Inventors: Yoshiki Katoh, Kariya (JP); Masamichi Makihara, Kariya (JP); Kazutoshi Kuwayama, Kariya (JP); Norihiko Enomoto, Kariya (JP); Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 365 days.

(21) Appl. No.: 14/907,836

(22) PCT Filed: Jul. 15, 2014

(86) PCT No.: PCT/JP2014/003728
§ 371 (c)(1),
(2) Date: Jan. 27, 2016

(87) PCT Pub. No.: WO2015/015726
PCT Pub. Date: Feb. 5, 2015

(65) Prior Publication Data
US 2016/0178253 A1 Jun. 23, 2016

(30) Foreign Application Priority Data

Jul. 31, 2013 (JP) .................. 2013-158656

(51) Int. Cl.
*B60H 1/00* (2006.01)
*B60H 1/32* (2006.01)
(Continued)

(52) U.S. Cl.
CPC ....... *F25B 25/005* (2013.01); *B60H 1/00278* (2013.01); *B60H 1/00899* (2013.01);
(Continued)

(58) Field of Classification Search
CPC ........ F25B 25/005; F25B 30/02; F25B 49/02; F25B 41/00; F25B 2339/047;
(Continued)

(56) References Cited

U.S. PATENT DOCUMENTS 10,145,588 B2 * 12/2018 Nagano ................. F04B 39/04
2001/0025499 A1 * 10/2001 Takeuchi ............... F25B 9/008
62/175

(Continued)

FOREIGN PATENT DOCUMENTS

GB          987569 A     3/1965
JP       2004131034 A    4/2004
(Continued)

OTHER PUBLICATIONS

International Search Report and Written Opinion (in Japanese with English Translation) for PCT/JP2014/003728, dated Aug. 12, 2014; ISA/JP.

*Primary Examiner* — Ljiljana V. Ciric
(74) *Attorney, Agent, or Firm* — Harness, Dickey & Pierce, P.L.C.

(57) ABSTRACT

An air conditioning device for a vehicle having a compressor that supplies a high-pressure refrigerant, an air heating heat exchanger heating air that is to be blown into a vehicle cabin, a pressure reduction part expanding and decompressing the high-pressure refrigerant so as to supply an intermediate-pressure refrigerant and a low-pressure refrigerant, a first low-pressure side heat exchanger exchanging heat between the intermediate-pressure refrigerant and a heating medium other than the air, a second low-pressure side heat exchanger cooling the heating medium by exchanging heat between the low-pressure refrigerant and the heating medium, a first heating medium circuit through which the heating medium cooled in the second low-pressure side heat (Continued)

exchanger circulates, and a heating medium-air heat exchanger.

14 Claims, 7 Drawing Sheets

(51) Int. Cl.
    *F25B 25/00*           (2006.01)
    *F25B 30/02*           (2006.01)
    *F25B 41/00*           (2006.01)
    *F25B 49/02*           (2006.01)
    *H01M 10/625*         (2014.01)
    *H01M 10/663*         (2014.01)

(52) U.S. Cl.
    CPC .............. *F25B 30/02* (2013.01); *F25B 41/00* (2013.01); *F25B 49/02* (2013.01); *H01M 10/625* (2015.04); *H01M 10/663* (2015.04); *B60H 2001/00307* (2013.01); *B60H 2001/3298* (2013.01); *F25B 2339/047* (2013.01); *F25B 2341/0011* (2013.01); *H01M 2220/20* (2013.01)

(58) Field of Classification Search
    CPC ......... F25B 2341/0011; B60H 1/00278; B60H 1/00899; B60H 2001/00307; B60H 2001/3298; H01M 10/625; H01M 10/663; H01M 2220/20
    See application file for complete search history.

(56) References Cited

U.S. PATENT DOCUMENTS

| | | | | |
|---|---|---|---|---|
| 2002/0000095 A1* | 1/2002 | Takeuchi | .................. | F04F 5/04 62/500 |
| 2004/0060316 A1* | 4/2004 | Ito | ...................... | B60H 1/00328 62/324.1 |
| 2004/0069012 A1 | 4/2004 | Inoue | | |
| 2005/0034473 A1* | 2/2005 | Casar | ................. | B60H 1/00899 62/324.1 |
| 2005/0188719 A1* | 9/2005 | Sugiura | ................ | B41J 2/17596 62/500 |
| 2006/0254308 A1* | 11/2006 | Yokoyama | ........... | B60H 1/3205 62/500 |
| 2007/0289318 A1* | 12/2007 | Nakamura | ................ | F25B 5/00 62/150 |
| 2008/0041079 A1* | 2/2008 | Nishijima | ................. | F25B 5/00 62/191 |
| 2008/0098757 A1* | 5/2008 | Takeuchi | ................ | F25B 41/00 62/217 |
| 2009/0013704 A1* | 1/2009 | Oshitani | ................. | F25B 41/00 62/191 |
| 2009/0095003 A1* | 4/2009 | Nagano | ................... | F25B 39/02 62/217 |
| 2009/0229304 A1* | 9/2009 | Ogata | ....................... | F25B 5/04 62/500 |
| 2009/0229305 A1* | 9/2009 | Yamada | ................. | F25B 41/00 62/500 |
| 2009/0232665 A1* | 9/2009 | Gocho | ...................... | F04F 5/04 417/151 |
| 2011/0061423 A1* | 3/2011 | Ogata | ....................... | F04F 5/10 62/500 |
| 2011/0219793 A1* | 9/2011 | Nakamura | .............. | F25B 41/00 62/115 |
| 2011/0259039 A1* | 10/2011 | Ma | .......................... | F25B 15/02 62/495 |
| 2011/0259042 A1* | 10/2011 | Nishino | ................ | F28D 1/0333 62/527 |
| 2013/0061627 A1 | 3/2013 | Neumeister et al. | | |
| 2014/0318170 A1 | 10/2014 | Katoh et al. | | |
| 2015/0300706 A1* | 10/2015 | Awa | ...................... | F25B 29/003 62/324.6 |
| 2016/0159204 A1* | 6/2016 | Katoh | .................. | B60H 1/3211 62/185 |
| 2016/0167481 A1* | 6/2016 | Makihara | ............... | B60K 11/02 237/5 |
| 2016/0288618 A1* | 10/2016 | Katoh | .................. | B60H 1/00335 |

FOREIGN PATENT DOCUMENTS

| | | |
|---|---|---|
| JP | 2006125769 A | 5/2006 |
| JP | 2009133624 A | 6/2009 |
| JP | 2011025830 A | 2/2011 |
| JP | 2011247547 A | 12/2011 |
| JP | 2012011928 A | 1/2012 |
| JP | 2013052877 A | 3/2013 |
| JP | 2013-060190 A | 4/2013 |
| WO | WO-2013084418 A1 | 6/2013 |

* cited by examiner

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2014/003728 filed on Jul. 15, 2014 and published in Japanese as WO 2015/015726 A1 on Feb. 5, 2015. This application is based on and claims the benefit of priority from Japanese Patent Application No. 2013-158656 filed on Jul. 31, 2013. The entire disclosures of all of the above applications are incorporated herein by reference.

TECHNICAL FIELD

The present disclosure relates to an air conditioning device for a vehicle.

BACKGROUND ART

As described in Patent Literature 1, an air conditioning device for a vehicle is conventionally known to have an exterior heat exchanger and an interior condenser. In the exterior heat exchanger, an outside air exchanges heat with a low-pressure side refrigerant of a refrigeration cycle. In the interior condenser, a high-pressure side refrigerant of the refrigeration cycle exchanges heat with air that is to be blown into a vehicle cabin.

In this conventional art, the low-pressure side refrigerant of the refrigeration cycle absorbs heat from the outside air in the exterior heat exchanger, and the high-pressure side refrigerant in the refrigeration cycle radiates heat to the air to be blown into the vehicle cabin in the interior condenser. In this way, the air to be blown into the vehicle cabin can be heated by pumping heat of the outside air. That is, a heating operation can be performed by a heat pump cycle.

PRIOR ART LITERATURES

Patent Literature

Patent Literature 1: JP 2013-052877 A

SUMMARY OF INVENTION

According to consideration of the inventors of the subject application, in the conventional art, a temperature of the refrigerant that has exchanged heat in the exterior heat exchanger is reduced when a temperature of the outside air becomes low, mainly in the winter, and thus density of the refrigerant that is drawn into a compressor of the refrigeration cycle is reduced. As a result, heating performance is possibly degraded.

In view of the above, it is an objective of the present disclosure to provide an air conditioning device for a vehicle that can improve heating performance at a time of a low outside air temperature.

To achieve the above objective, an air conditioning device for a vehicle of the present disclosure has a compressor, an air heating heat exchanger, a pressure reduction part, a first low-pressure side heat exchanger, a second low-pressure side heat exchanger, a first heating medium circuit, and a heating medium-air heat exchanger.

The compressor supplies a high-pressure refrigerant by drawing and discharging a refrigerant. The air heating heat exchanger heats air that is to be blown into a vehicle cabin by using heat of the high-pressure refrigerant. The pressure reduction part expands and decompresses the high-pressure refrigerant and supplies as an intermediate-pressure refrigerant and a low-pressure refrigerant. The first low-pressure side heat exchanger exchanges heat between the intermediate-pressure refrigerant and a heating medium other than the air. The second low-pressure side heat exchanger cools the heating medium by exchanging heat between the low-pressure refrigerant and the heating medium. The heating medium cooled in the second low-pressure side heat exchanger circulates through the first heating medium circuit. The heating medium-air heat exchanger causes the heating medium to absorb heat by exchanging heat between the air and the heating medium circulating through the first heating medium circuit.

Accordingly, the first low-pressure side heat exchanger and the second low-pressure side heat exchanger exchange heat between the refrigerant and the heating medium other than the air. Thus, even in the case where a temperature of the air is low, a temperature of the refrigerant that exchanges heat in the first low-pressure side heat exchanger and the second low-pressure side heat exchanger (that is, a temperature of the refrigerant drawn into the compressor) can be restricted from being reduced. As a result, density of the refrigerant drawn into the compressor can be restricted from being reduced.

Furthermore, the pressure reduction part supplies the intermediate-pressure refrigerant and the low-pressure refrigerant, the intermediate-pressure refrigerant exchanges heat in the first low-pressure side heat exchanger, and the low-pressure refrigerant exchanges heat in the second low-pressure side heat exchanger. Accordingly, the refrigerants in two types of temperature ranges can absorb heat. Thus, compared to a case where the refrigerant in one type of the temperature range absorbs heat, the refrigerant can efficiently absorb heat. For example, such a use method that the first low-pressure side heat exchanger absorbs waste heat of in-vehicle device and that the second low-pressure side heat exchanger absorbs heat from the air is possible. Thus, heating performance can be restricted from being degraded even at a time of a low outside air temperature.

Alternatively, an air conditioning device for a vehicle of the present disclosure has a first heating medium circuit, a compressor, a high-pressure side heat exchanger, an air heating heat exchanger, a pressure reduction part, and a first low-pressure side heat exchanger.

A heating medium circulates through the first heating medium circuit. The compressor draws and discharges a refrigerant. The high-pressure side heat exchanger heats the heating medium by exchanging heat between the refrigerant that is discharged by the compressor and the heating medium that circulates through the first heating medium circuit. The air heating heat exchanger heats air that is to be blown into a vehicle cabin by exchanging heat between the heating medium heated in the high-pressure side heat exchanger and the air that is to be blown into the vehicle cabin. The pressure reduction part expands and decompresses the refrigerant that is after exchanging heat in the high-pressure side heat exchanger. The first low-pressure side heat exchanger exchanges heat between the heating medium and the refrigerant that is expanded and decompressed in the pressure reduction part. The heating medium heated in the high-pressure side heat exchanger is capable of being introduced to the first low-pressure side heat exchanger.

Accordingly, a heat quantity of the heating medium that is heated in the high-pressure side heat exchanger can be introduced to the first low-pressure side heat exchanger. As a result, the density of the refrigerant that is drawn into the compressor can be increased by increasing the temperature of the refrigerant that has exchanged heat in the first low-pressure side heat exchanger even at the time of the low outside air temperature. Thus, the heating performance can be improved even at the time of the low outside air temperature.

DESCRIPTION OF EMBODIMENTS

Figure 1:
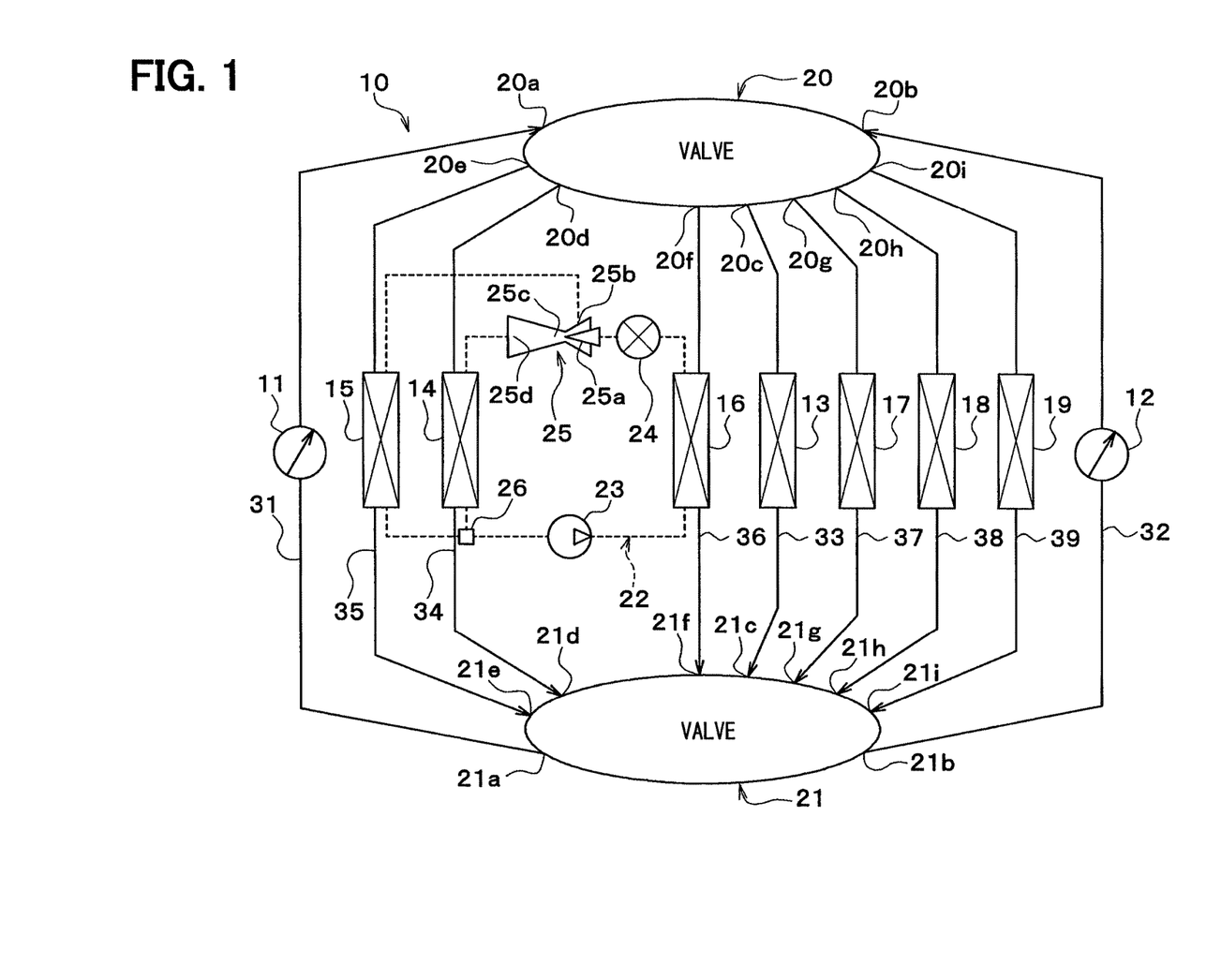
FIG. 1 is an overall configuration diagram illustrating an air conditioning device for a vehicle in an embodiment.

A description will hereinafter be made on an embodiment on the basis of FIG. 1 to FIG. 6. A vehicular heat management system 10 shown in FIG. 1 is used to adjust various types of device provided in a vehicle and inside of a vehicle cabin at an appropriate temperature. In this embodiment, the vehicular heat management system 10 is applied to a hybrid vehicle that obtains drive power for a vehicle travel from an engine (i.e., an internal combustion engine) and an electric motor for travel.

The hybrid vehicle of this embodiment is a plug-in hybrid vehicle that can store electric power supplied from an external power source (i.e., a commercial power source) during parking of the vehicle in a battery mounted in the vehicle (i.e., an in-vehicle battery). A lithium-ion battery can be used as the battery, for example.

The drive power output from the engine is used not only for the vehicle travel but is also used to actuate a generator. The electric power generated by the generator and the electric power supplied from the external power source can be stored in the battery, and the electric power stored in the battery is supplied not only to the electric motor for travel but also to various types of onboard device including electrically-configured device that constitutes the vehicular heat management system 10.

As shown in FIG. 1, the vehicular heat management system 10 includes a first pump 11, a second pump 12, a radiator 13, a first coolant cooling heat exchanger 14, a second coolant cooling heat exchanger 15, a coolant heating heat exchanger 16, a cooler core 17, a heater core 18, device 19, a first switching valve 20, and a second switching valve 21.

The first pump 11 and the second pump 12 are an electric pump that draws and discharges a coolant (i.e., a heating medium). The coolant is a fluid as a heating medium. In this embodiment, a liquid that at least contains ethylene glycol, dimethyl polysiloxane, or a nano fluid, or an antifreeze liquid is used as the coolant.

The radiator 13, the first coolant cooling heat exchanger 14, the second coolant cooling heat exchanger 15, the coolant heating heat exchanger 16, the cooler core 17, the heater core 18, and the device 19 are a coolant flowing device (i.e., a heating medium flowing device) through which the coolant flows.

The radiator 13 is a heat exchanger (i.e., a heating medium—outside air heat exchanger, a heating medium-air heat exchanger) that exchanges heat between the coolant and the outside air (i.e., vehicle cabin outside air). The radiator 13 functions as a heat radiator that radiates heat of the coolant to the outside air when the coolant temperature is higher than the outside air temperature, and functions as a heat absorber that causes the coolant to absorb heat of the outside air when the coolant temperature is lower than the outside air temperature.

The outside air is delivered to the radiator 13 by an exterior blower (not shown). The radiator 13 and the exterior blower are arranged in a forefront of the vehicle. Thus, the radiator 13 can be exposed to a travel wind during a travel of the vehicle.

The first coolant cooling heat exchanger 14 and the second coolant cooling heat exchanger 15 are cooling means for cooling the coolant. More specifically, the first coolant cooling heat exchanger 14 and the second coolant cooling heat exchanger 15 are low-pressure side heat exchangers (i.e., a heating medium cooling heat exchanger, a heating medium refrigerant heat exchanger) for cooling the coolant by exchanging heat between a low-pressure side refrigerant and the coolant in a refrigeration cycle 22.

The coolant heating heat exchanger 16 is heating means that heats the coolant. More specifically, the coolant heating heat exchanger 16 is a high-pressure side heat exchanger (i.e., a heating medium heating heat exchanger, the heating medium refrigerant heat exchanger) that heats the coolant by exchanging heat between a high-pressure side refrigerant and the coolant in the refrigeration cycle 22.

The refrigeration cycle 22 is a vapor-compression type refrigerator that includes a compressor 23, the coolant heating heat exchanger 16, an expansion valve 24, an ejector 25, the first coolant cooling heat exchanger 14, the second coolant cooling heat exchanger 15, and a gas-liquid separator 26. In the refrigeration cycle 22 of this embodiment, a chlorofluorocarbon-based refrigerant is used as the refrigerant, and a subcritical refrigeration cycle in which pressure of the high-pressure side refrigerant does not exceed critical pressure of the refrigerant is configured.

The compressor 23 is an electric compressor that is driven by the electric power supplied from the battery or a variable displacement compressor that is driven by a belt, and draws, compresses, and discharges the refrigerant in the refrigeration cycle 22.

The coolant heating heat exchanger 16 is a condenser that condenses the high-pressure side refrigerant by exchanging heat between the high-pressure side refrigerant discharged from the compressor 23 and the coolant. The expansion valve 24 is a pressure reduction part that decompresses and expands a liquid-phase refrigerant that has flowed from the coolant heating heat exchanger 16.

The ejector 25 is a pressure reduction part that reduces pressure of the refrigerant and supplies the refrigerant as an intermediate-pressure refrigerant and the low-pressure refrigerant, and is also a refrigerant circulation device (i.e., a momentum transportation type pump) for circulating the refrigerant by a suction action of a refrigerant flow injected at a high speed. The ejector 25 has a nozzle portion 25*a*, a refrigerant suction port 25*b*, a mixing section 25*c*, and a diffuser section 25*d*.

In the ejector 25, the refrigerant is drawn as the suction refrigerant from the refrigerant suction port 25*b* by a suction action of a high-speed injection refrigerant that is injected from the nozzle portion 25*a*, and pressure of the mixed refrigerant of the injection refrigerant and the suction refrigerant in the diffuser section 25*d*.

The nozzle portion 25*a* reduces a passage area of the intermediate-pressure refrigerant that flows in from the expansion valve 24, and the intermediate-pressure refrigerant is expanded and decompressed in an isentropic manner. A refrigerant inlet side of the nozzle portion 25*a* is connected to a refrigerant outlet side of the expansion valve 24.

The refrigerant suction port 25*b* is arranged to communicate with a refrigerant injection port of the nozzle portion 25*a* and draws the refrigerant from the second coolant cooling heat exchanger 15. The refrigerant suction port 25*b* is connected to the refrigerant outlet side of the second coolant cooling heat exchanger 15.

The mixing section 25*c* is arranged in a downstream portion of the nozzle portion 25*a* and the refrigerant suction port 25*b* to mix a high-speed refrigerant flow (the injection refrigerant) injected from the nozzle portion 25*a* and the suction refrigerant (the low-pressure refrigerant).

The diffuser section 25*d* is arranged on a downstream side of the mixing section 25*c* and formed in a shape to gradually increase the passage area of the refrigerant. The diffuser section 25*d* is a pressure boosting portion 25*d* for boosting refrigerant pressure by reducing a speed of the refrigerant flow. That is, the diffuser section 25*d* converts speed energy of the refrigerant into pressure energy.

The first coolant cooling heat exchanger 14 is connected to a downstream side of the diffuser section 25*d*.

The first coolant cooling heat exchanger 14 is an evaporator (i.e., a first low-pressure side heat exchanger) for evaporating the intermediate-pressure refrigerant by exchanging heat between the coolant and the intermediate-pressure refrigerant of which pressure is after being boosted in the diffuser section 25*d*.

The gas-liquid separator 26 is a refrigerant distribution section that separates a liquid and gas of the refrigerant that flows out from the first coolant cooling heat exchanger 14, that flows out a gas-phase refrigerant to the refrigerant suction side of the compressor 23, and that causes a liquid-phase refrigerant to flow out to the refrigerant inlet side of the second coolant cooling heat exchanger 15.

The second coolant cooling heat exchanger 15 is an evaporator (i.e., a second low-pressure side heat exchanger) for evaporating the liquid-phase refrigerant by exchanging heat between the liquid-phase refrigerant (i.e., the low-pressure refrigerant) that has flowed out from the gas-liquid separator 26 and the coolant. The refrigerant that is evaporated in the second coolant cooling heat exchanger 15 is drawn to the refrigerant suction port 25*b* of the ejector 25.

The cooler core 17 is an air-cooling heat exchanger (i.e., an air cooler, the heating medium-air heat exchanger) that cools the air to be blown into the vehicle cabin by exchanging heat between the coolant and the air to be blown into the vehicle cabin. The heater core 18 is an air-heating heat exchanger (i.e., an air heater, the heating medium-air heat exchanger) that heats the air to be blown into the vehicle cabin by exchanging heat between the air to be blown into the vehicle cabin and the coolant.

The device 19 is heat transfer device (i.e., temperature adjustment target device) that has a path through which the coolant flows and that transfers heat to/from the coolant. The device 19 is an inverter, a battery, a battery temperature adjustment heat exchanger, an electric motor for travel, engine peripheral device, a cold and heat storage body, a ventilation heat-recovery heat exchanger, a coolant/coolant heat exchanger, or the like, for example.

The inverter is an electric power converter that converts DC power supplied from the battery to AC voltage and outputs the AC voltage to the electric motor for travel. The inverter is heat generation device that generates heat when being operated.

The battery temperature adjustment heat exchanger is a heat exchanger (i.e., an air/heating medium heat exchanger) that is arranged in a ventilation passage to the battery and exchanges heat between the air and the coolant.

The engine peripheral device is a turbocharger, an intercooler, an EGR cooler, a CVT warmer, a CVT cooler, or exhaust heat recovery device, for example.

The turbocharger is a supercharger for supercharging the suction air (i.e., intake air) of the engine. The intercooler is an intake air cooler (i.e., an intake air/heating medium heat exchanger) for cooling the supercharged intake air that is after being compressed by the turbocharger and reached a high temperature, by exchanging heat between the supercharged intake air and the coolant.

The EGR cooler is an exhaust/coolant heat exchanger (i.e., an exhaust/heating medium heat exchanger) for cooling engine exhaust gas (exhaust) to be returned to the intake side of the engine by exchanging heat between the exhaust and the coolant.

The CVT warmer is a lubricant/coolant heat exchanger (i.e., a lubricant/heating medium heat exchanger) that heats lubricant (i.e., CVT oil), which lubricates a continuously variable transmission (i.e., CVT), by exchanging heat between the CVT oil and the coolant.

The CVT cooler is a lubricant/coolant heat exchanger (i.e., a lubricant/heating medium heat exchanger) for cooling the CVT oil by exchanging heat between the CVT oil and the coolant.

The exhaust heat recovery device is an exhaust/coolant heat exchanger (i.e., an exhaust/heating medium heat exchanger) that causes the coolant to absorb the exhaust heat by exchanging heat between the exhaust and the coolant.

The cold and heat storage body stores warm heat or cold heat of the coolant. A chemical heat storage material, a heat insulating tank, a latent-heat type heat storage body (i.e., paraffin or a hydrate-based material), and the like can be raised as examples of the cold and heat storage body.

The ventilation heat-recovery heat exchanger is a heat exchanger that recovers heat (i.e., cold heat or warm heat) discharged from the inside of the vehicle cabin to the outside of the vehicle cabin for ventilation. That is, the ventilation heat-recovery heat exchanger is a heat exchanger that recovers heat (i.e., cold heat or warm heat) discharged to the outside through ventilation. For example, since the ventilation heat-recovery heat exchanger recovers heat (i.e., cold heat or warm heat) discharged to the outside through the ventilation, power required for cooling or heating can be reduced.

The coolant/coolant heat exchanger is a heat exchanger that exchanges heat between the coolant and the coolant. For example, the coolant/coolant heat exchanger exchanges heat between the coolant in the vehicular heat management system 10 (i.e., the coolant circulated by the first pump 11 or the second pump 12) and the coolant in an engine cooling circuit (i.e., a circuit through which the coolant for cooling the engine circulates). In this way, heat can be transferred between the vehicular heat management system 10 and the engine cooling circuit.

The first pump 11 is arranged in a first pump path 31. The second pump 12 is arranged in a second pump path 32. The radiator 13 is arranged in a radiator path 33.

The first coolant cooling heat exchanger 14 is arranged in a first coolant cooling heat exchanger path 34. The second coolant cooling heat exchanger 15 is arranged in a second coolant cooling heat exchanger path 35. The coolant heating heat exchanger 16 is arranged in a coolant heating heat exchanger path 36.

The cooler core 17 is arranged in a cooler core path 37. The heater core 18 is arranged in a heater core path 38. The device 19 is arranged in a device path 39.

The first pump path 31, the second pump path 32, the radiator path 33, the first coolant cooling heat exchanger path 34, the second coolant cooling heat exchanger path 35, the coolant heating heat exchanger path 36, the cooler core path 37, the heater core path 38, and the device path 39 are connected to the first switching valve 20 and the second switching valve 21.

The first switching valve 20 and the second switching valve 21 are a switching part (i.e., a heating medium flow switching part) switching a flow of the coolant.

The first switching valve 20 is a multi-way valve that has the large number of ports (i.e., first switching valve ports), each of which constitutes an inlet or an outlet of the coolant. More specifically, the first switching valve 20 has a first inlet 20a and a second inlet 20b as the inlets of the coolant, and has first to seventh outlets 20c to 20i as the outlets of the coolant.

The second switching valve 21 is a multi-way valve that has the large number of ports (i.e., second switching valve ports), each of which constitutes an inlet or an outlet of the coolant. More specifically, the second switching valve 21 has a first outlet 21a and a second outlet 21b as the outlets of the coolant, and has first to seventh inlets 21c to 21i as the inlets of the coolant.

One end of the first pump path 31 is connected to the first inlet 20a of the first switching valve 20. In other words, a coolant discharge side of the first pump 11 is connected to the first inlet 20a of the first switching valve 20.

One end of the second pump path 32 is connected to the second inlet 20b of the first switching valve 20. In other words, a coolant discharge side of the second pump 12 is connected to the second inlet 20b of the first switching valve 20.

One end of the radiator path 33 is connected to the first outlet 20c of the first switching valve 20. In other words, the coolant inlet side of the radiator 13 is connected to the first outlet 20c of the first switching valve 20.

One end of the first coolant cooling heat exchanger path 34 is connected to the second outlet 20d of the first switching valve 20. In other words, a coolant inlet side of the first coolant cooling heat exchanger 14 is connected to the second outlet 20d of the first switching valve 20.

One end of the second coolant cooling heat exchanger path 35 is connected to the third outlet 20e of the first switching valve 20. In other words, a coolant inlet side of the second coolant cooling heat exchanger 15 is connected to the third outlet 20e of the first switching valve 20.

One end of the coolant heating heat exchanger path 36 is connected to the fourth outlet 20f of the first switching valve 20. In other words, a coolant inlet side of the coolant heating heat exchanger 16 is connected to the fourth outlet 20f of the first switching valve 20.

One end of the cooler core path 37 is connected to the fifth outlet 20g of the first switching valve 20. In other words, a coolant inlet side of the cooler core 17 is connected to the fifth outlet 20g of the first switching valve 20.

One end of the heater core path 38 is connected to the sixth outlet 20h of the first switching valve 20. In other words, a coolant inlet side of the heater core 18 is connected to the sixth outlet 20h of the first switching valve 20.

One end of the device path 39 is connected to the seventh outlet 20i of the first switching valve 20. In other words, a coolant inlet side of the device 19 is connected to the seventh outlet 20i of the first switching valve 20.

The other end of the first pump path 31 is connected to the first outlet 21a of the second switching valve 21. In other words, a coolant suction side of the first pump 11 is connected to the first outlet 21a of the second switching valve 21.

The other end of the second pump path 32 is connected to the second outlet 21b of the second switching valve 21. In other words, a coolant suction side of the second pump 12 is connected to the second outlet 21b of the second switching valve 21.

The other end of the radiator path 33 is connected to the first inlet 21c of the second switching valve 21. In other words, a coolant outlet side of the radiator 13 is connected to the first inlet 21c of the second switching valve 21.

The other end of the first coolant cooling heat exchanger path 34 is connected to the second inlet 21d of the second switching valve 21. In other words, a coolant outlet side of the first coolant cooling heat exchanger 14 is connected to the second inlet 21d of the second switching valve 21.

The other end of the second coolant cooling heat exchanger path 35 is connected to the third inlet 21e of the second switching valve 21. In other words, a coolant outlet side of the second coolant cooling heat exchanger 15 is connected to the third inlet 21e of the second switching valve 21.

The other end of the heater core path 38 is connected to the fourth inlet 21f of the second switching valve 21. In other words, a coolant outlet side of the heater core 18 is connected to the fourth inlet 21f of the second switching valve 21.

The other end of the cooler core path 37 is connected to the fifth inlet 21g of the second switching valve 21. In other words, a coolant outlet side of the cooler core 17 is connected to the fifth inlet 21g of the second switching valve 21.

The other end of the heater core path 38 is connected to the sixth inlet 21h of the second switching valve 21. In other words, a coolant outlet side of the heater core 18 is connected to the sixth inlet 21h of the second switching valve 21.

The other end of the device path 39 is connected to the seventh inlet 21i of the second switching valve 21. In other words, a coolant outlet side of the device 19 is connected to the seventh inlet 21i of the second switching valve 21.

The first switching valve 20 has a structure that can arbitrary or selectively switch a communication state with each of the inlets 20a, 20b and each of the outlets 20c to 20i. The second switching valve 21 also has a structure that can arbitrary or selectively switch a communication state with each of the outlets 21a, 21b and each of the inlets 21c to 21i.

More specifically, the first switching valve 20 switches among a state that the coolant discharged from the first pump 11 flows in, a state that the coolant discharged from the second pump 12 flows in, and a state that neither the coolant discharged from the first pump 11 nor the coolant discharged from the second pump 12 flows in for each of the radiator 13, the first coolant cooling heat exchanger 14, the second coolant cooling heat exchanger 15, the coolant heating heat exchanger 16, the cooler core 17, and the heater core 18.

The second switching valve 21 switches among a state that the coolant flows out into the first pump 11, a state that the coolant flows out into the second pump 12, and a state that the coolant flows out into neither the first pump 11 nor the second pump 12 for each of the radiator 13, the first coolant cooling heat exchanger 14, the second coolant cooling heat exchanger 15, the coolant heating heat exchanger 16, the cooler core 17, and the heater core 18.

Structural examples of the first switching valve 20 and the second switching valve 21 will briefly be described. The first switching valve 20 and the second switching valve 21 respectively include a case that forms an outer shell and a valve body that is accommodated in the case. The inlets and the outlets of the coolant are formed at predetermined positions of the cases, and the communication state between each of the inlets and each of the outlets of the coolant is changed by a rotational operation of each of the valve bodies.

The valve body of the first switching valve 20 and the valve body of the second switching valve 21 are rotationally and independently driven by separate electric motors. The valve body of the first switching valve 20 and the valve body of the second switching valve 21 may rotationally be driven in an interlocking manner by a common electric motor.

Figure 2:
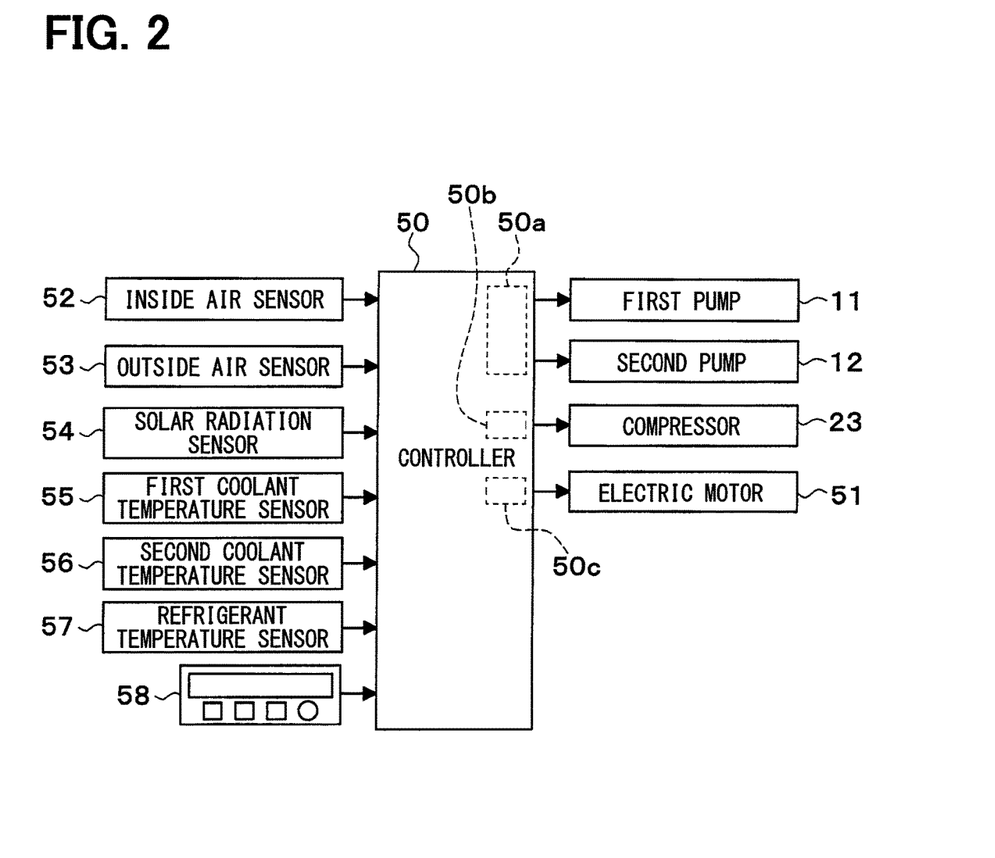
FIG. 2 is a block diagram explaining an electric control unit of the air conditioning device for a vehicle in the embodiment.

Next, an electric control unit of the vehicular heat management system 10 will be described on the basis of FIG. 2. A controller 50 is constructed of a well-known microcomputer that includes a CPU, a ROM, a RAM, and the like and a peripheral circuit thereof. The controller 50 performs various types of computations and processes on the basis of an air-conditioning control program stored in the ROM thereof and controls actuation of the first pump 11, the second pump 12, the compressor 23, a switching valve electric motor 51, and the like that are connected to an output side.

The switching valve electric motor 51 is a switching valve driving device that drives the valve body of the first switching valve 20 and the valve body of the second switching valve 21. In this embodiment, the electric motor for driving the valve body of the first switching valve 20 and the electric motor for driving the valve body of the second switching valve 21 are separately provided as the switching valve electric motors 51.

In the controller 50, control units for controlling various types of control target device that are connected to the output side thereof are integrally configured. A configuration (hardware and software) for controlling actuation of each type of the control target device constitutes the control unit for controlling the actuation of each type of the control target device.

In this embodiment, a configuration (hardware and software) for controlling the actuation of the first pump 11 and the second pump 12 is a pump control unit 50a. The pump control unit 50a may separately be configured from the controller 50.

In this embodiment, a configuration (hardware and software) for controlling the actuation of the switching valve electric motor 51 is a switching control unit 50b. The switching control unit 50b may separately be configured from the controller 50.

In this embodiment, a configuration (hardware and software) for controlling the actuation of the compressor 23 is a compressor control unit 50c. The compressor control unit 50c may separately be configured from the controller 50.

Detection signals of a sensor group, such as an inside air sensor 52, an outside air sensor 53, a solar radiation sensor 54, a first coolant temperature sensor 55, a second coolant temperature sensor 56, and a refrigerant temperature sensor 57, are input to an input side of the controller 50.

The inside air sensor 52 is a detector (i.e., an inside air temperature detector) that detects an inside air temperature (i.e., a vehicle cabin inside temperature). The outside air sensor 53 is a detector (i.e., an outside air detector) that detects an outside air temperature (i.e., a vehicle cabin outside temperature). The solar radiation sensor 54 is a detector (i.e., a solar radiation amount detector) that detects a solar radiation amount in the vehicle cabin.

The first coolant temperature sensor 55 is a detector (i.e., a first heating medium temperature detector) that detects the temperature of the coolant flowing through the first pump path 31 (e.g., the temperature of the coolant that is drawn into the first pump 11).

The second coolant temperature sensor 56 is a detector (i.e., a second heating medium temperature detector) that detects the temperature of the coolant flowing through the second pump path 32 (e.g., the temperature of the coolant that is drawn into the second pump 12).

The refrigerant temperature sensor 57 is a detector (i.e., a refrigerant temperature detector) that detects the temperature of the refrigerant in the refrigeration cycle 22 (e.g., the temperature of the refrigerant discharged from the compressor 23).

The inside air temperature, the outside air temperature, the coolant temperatures, and the refrigerant temperature may be estimated on the basis of detection values of various physical quantities.

An operation signal from an air conditioner switch 58 is input to the input side of the controller 50. The air conditioner switch 58 is a switch that switches on/off of the air conditioner (i.e., on/off of cooling) and is arranged near a dashboard in the vehicle cabin.

Next, the actuation in the above configuration will be described. A mode is switched among various actuation modes when the controller 50 controls the actuation of the first pump 11, the second pump 12, the compressor 23, the switching valve electric motor 51, and the like.

For example, a first coolant circuit is formed by the first pump path 31 and at least one path of the radiator path 33, the device path 36, the cooler core path 37, the heater core path 38, and the device path 39. Furthermore, a second coolant circuit is formed by the second pump path 32 and at least one path of the radiator path 33, the device path 36, the cooler core path 37, the heater core path 38, and the device path 39.

The first coolant circuit and the second coolant circuit are a heating medium circuit (i.e., a first heating medium circuit and a second heating medium circuit) through which the heating medium other than the air circulates.

The radiator 13, the cooler core 17, the heater core 18, and the device 19 can be adjusted at an appropriate temperature in correspondence with a situation by switching between a case of being connected to the first coolant circuit and a case of being connected to the second coolant circuit for each of the radiator path 33, the device path 36, the cooler core path 37, the heater core path 38, and the device path 39.

That is, in the case where the first coolant cooling heat exchanger 14 and the device 19 are connected to the same coolant circuit, the device 19 can be cooled by the coolant that is after being cooled in the first coolant cooling heat exchanger 14. In the case where the coolant heating heat exchanger 16 and the device 19 are connected to the same coolant circuit, the device 19 can be heated by the coolant that is after being heated in the coolant heating heat exchanger 16.

In the case where the first coolant cooling heat exchanger 14 and the heater core 17 are connected to the same coolant circuit, the inside of the vehicle cabin can be cooled by cooling the air to be blown into the vehicle cabin by the heater core 17.

In the case where the coolant heating heat exchanger 16 and the heater core 18 are connected to the same coolant circuit, the inside of the vehicle can be warmed by heating the air to be blown into the vehicle cabin by the heater core 18.

In the case where the first coolant cooling heat exchanger 14 and the radiator 13 are connected to the same coolant circuit, a heat pump operation of the refrigeration cycle 22 can be conducted. In other words, the coolant that is after being cooled in the first coolant cooling heat exchanger 14 flows through the radiator 13 in the first coolant circuit. Thus, the coolant absorbs heat from the outside air in the radiator 13. Then, the coolant that has absorbed heat from the outside air in the radiator 13 exchanges heat with the refrigerant of the refrigeration cycle 22 and radiates heat in the first coolant cooling heat exchanger 14. Thus, in the first coolant cooling heat exchanger 14, the refrigerant of the refrigeration cycle 22 absorbs heat from the outside air via the coolant.

The refrigerant that has absorbed heat from the outside air in the first coolant cooling heat exchanger 14 exchanges heat with the coolant of the second coolant circuit and radiates heat in the coolant heating heat exchanger 16. Thus, the heat pump operation for pumping heat of the outside air can be realized.

Figure 3:
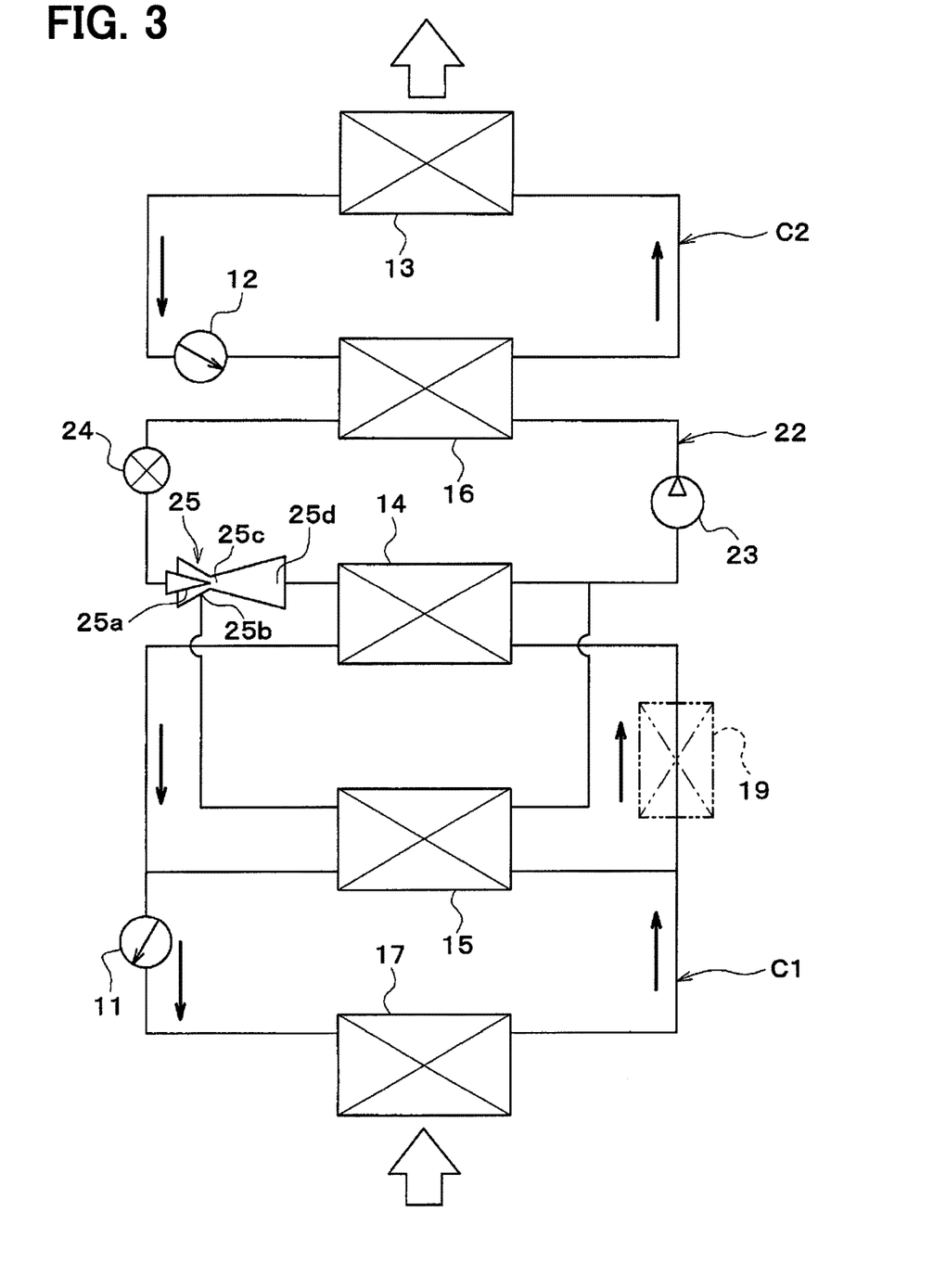
FIG. 3 is an operation explanatory diagram illustrating a cooling mode of the air conditioning device for a vehicle in the embodiment.
Figure 4:
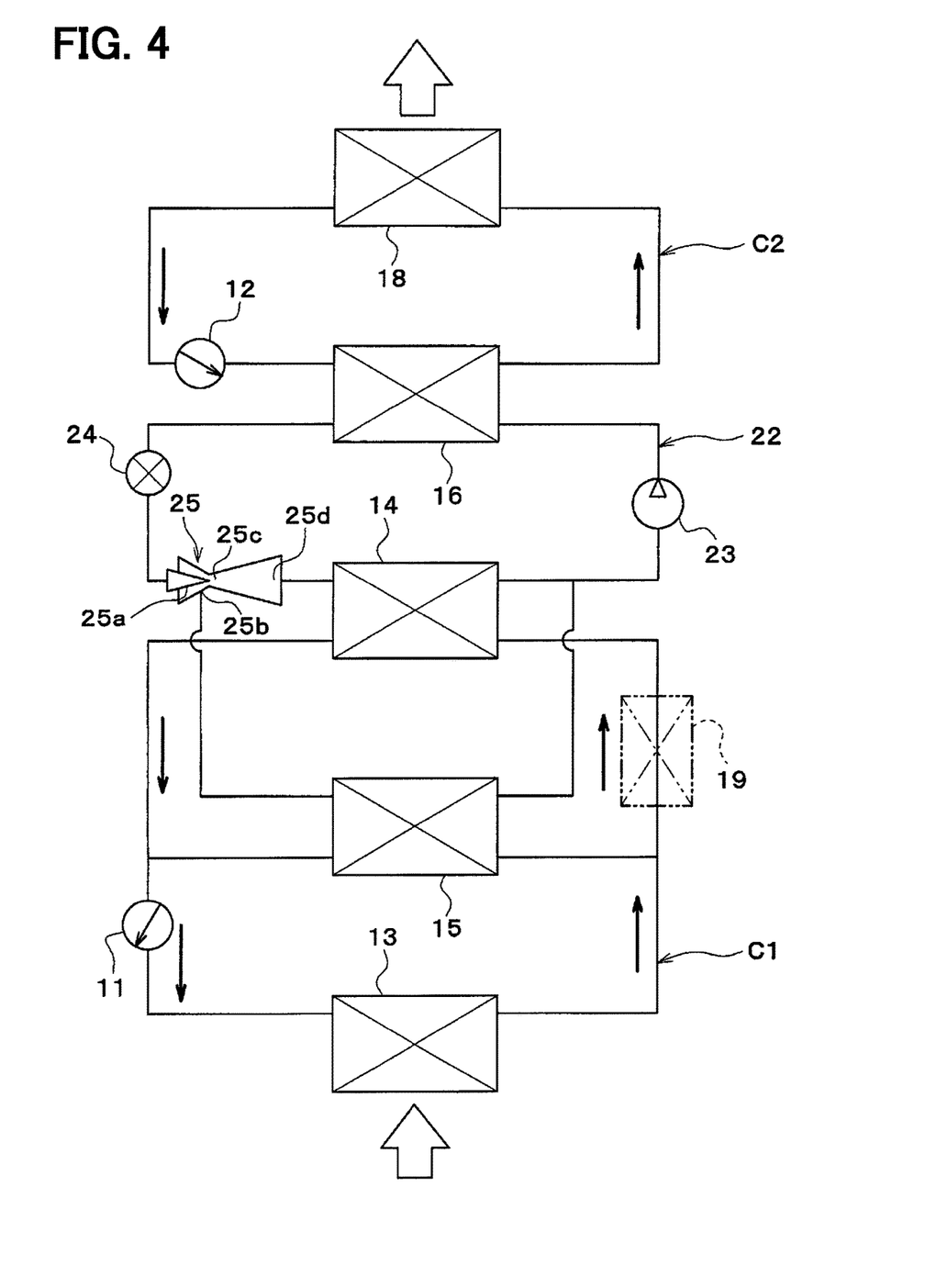
FIG. 4 is an operation explanatory diagram illustrating a first heating mode of the air conditioning device for a vehicle in the embodiment.
Figure 5:
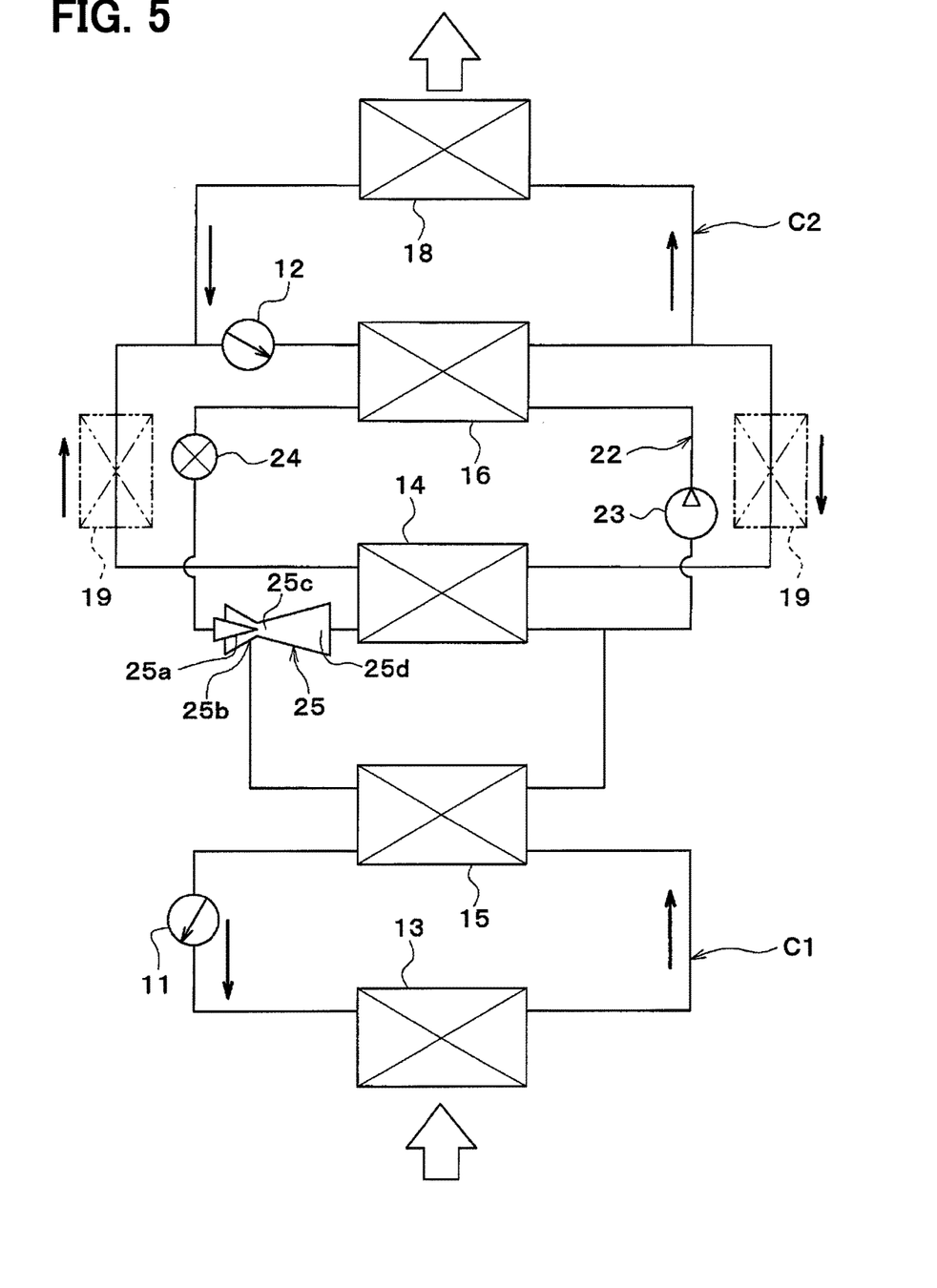
FIG. 5 is an operation explanatory diagram illustrating a second heating mode of the air conditioning device for a vehicle in the embodiment.

More specifically, the controller 50 switches between a cooling mode shown in FIG. 3 and a heating mode shown in FIG. 4 and FIG. 5. For example, the controller 50 selects the cooling mode in the case where a target blowing temperature TAO of blowing air that is blown into the vehicle cabin is in a low temperature range, selects a first heating mode shown in FIG. 4 in the case where the target blowing temperature TAO is in a high temperature range (i.e., in the case where a heating load becomes equal to or larger than a predetermined load), and selects a second heating mode shown in FIG. 5 in the case where the outside air temperature is an extremely low temperature (i.e., in the case where the heating load becomes excessively large).

The target blowing temperature TAO is calculated by the following equation.

$$TAO = Kset \times Tset - Kr \times Tr - Kam \times Tam - Ks \times Ts + C$$

Tset is a vehicle cabin inside setting temperature set by a vehicle cabin inside temperature setting switch. Tr is a vehicle cabin inside temperature (i.e., the inside air temperature) detected by the inside air sensor 52. Tam is the outside air temperature detected by the outside air sensor 53. Ts is a solar radiation amount detected by the solar radiation sensor 54. Kset, Kr, Kam, Ks are control gains, and C is a constant for correction.

The target blowing temperature TAO corresponds to the heat quantity that the air conditioning device for a vehicle needs to generate in order to keep the inside of the vehicle cabin at a desired temperature, and can be understood as air conditioning heat load (i.e., a cooling load and a heating load) required for the air conditioning device for a vehicle. That is, in the case where the cooling load required for the air conditioning device for a vehicle is large, the target blowing temperature TAO is in the low temperature range. In the case where the heating load required for the air conditioning device for a vehicle is large, the target blowing temperature is in the high temperature range.

As shown in FIG. 3, in the cooling mode, the first coolant cooling heat exchanger 14, the second coolant cooling heat exchanger 15, and the cooler core 17 are connected to a first coolant circuit C1, and the radiator 13 and the coolant heating heat exchanger 16 are connected to a second coolant circuit C2.

In this way, the coolant that is after being cooled in the first coolant cooling heat exchanger 14 and the second coolant cooling heat exchanger 15 absorbs heat in the cooler core 17, and the coolant that is after being heated in the coolant heating heat exchanger 16 radiates heat in the radiator 13. Thus, the inside of the vehicle cabin can be cooled by cooling the air to be blown into the vehicle cabin.

As shown in a two-dot chain line in FIG. 3, in the case where the device 19 is arranged on a coolant flow upstream side of the first coolant cooling heat exchanger 14, waste heat of the device 19 can be introduced into the first coolant cooling heat exchanger 14. Furthermore, since the temperature of the coolant flowing into the second coolant cooling heat exchanger 15 can be restricted from being increased by waste heat of the device 19, a heat absorbing ability of the second coolant cooling heat exchanger 15 can be secured.

As shown in FIG. 4, in the first heating mode, the first coolant cooling heat exchanger 14, the second coolant cooling heat exchanger 15, and the radiator 13 are connected to the first coolant circuit C1, and the coolant heating heat exchanger 16 and the heater core 18 are connected to the second coolant circuit C2.

In this way, the coolant that is after being cooled in the first coolant cooling heat exchanger 14 and the second coolant cooling heat exchanger 15 absorbs heat in the radiator 13, and the coolant that is after being heated in the coolant heating heat exchanger 16 radiates heat in the heater core 18. Thus, the inside of the vehicle cabin can be warmed by heating the air to be blown into the vehicle cabin.

As shown in a two-dot chain line in FIG. 4, in the case where the device 19 is arranged on the coolant flow upstream side of the first coolant cooling heat exchanger 14, waste heat of the device 19 can be introduced into the first coolant cooling heat exchanger 14. Furthermore, since the temperature of the coolant flowing into the second coolant cooling heat exchanger 15 can be restricted from being increased by waste heat of the device 19, the heat absorbing ability of the second coolant cooling heat exchanger 15 can be secured.

As shown in FIG. 5, in the second heating mode, the radiator 13 and the second coolant cooling heat exchanger 15 are connected to the first coolant circuit C1, and the first coolant cooling heat exchanger 14, the coolant heating heat exchanger 16, and the heater core 18 are connected to the second coolant circuit C2.

In this way, the coolant that is after being cooled in the second coolant cooling heat exchanger 15 absorbs heat in the radiator 13, and the coolant that is after being heated in the coolant heating heat exchanger 16 radiates heat in the heater core 18. Thus, the inside of the vehicle cabin can be warmed by heating the air to be blown into the vehicle cabin.

Furthermore, the coolant that is after being heated in the coolant heating heat exchanger 16 radiates heat in the first coolant cooling heat exchanger 14. As a result, heating performance can be improved by increasing density of the refrigerant that is drawn into the compressor 23.

Figure 6:
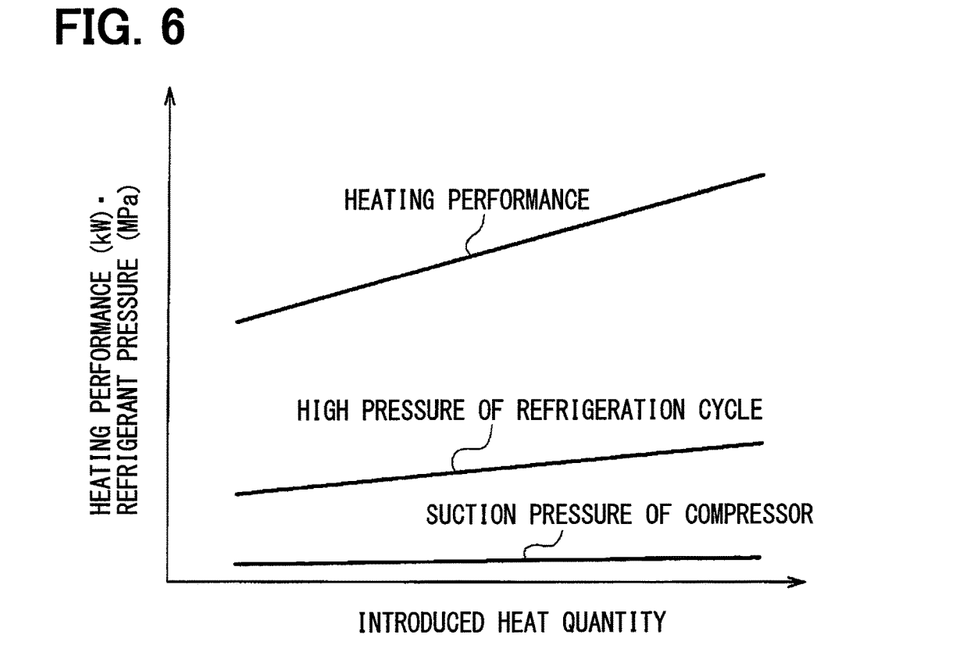
FIG. 6 is a graph showing a relationship between an introduced heat quantity and heating performance in the embodiment.

As shown in FIG. 6, as the quantity of heat that is introduced from the coolant heating heat exchanger 16 to the first coolant cooling heat exchanger 14 is increased, the high pressure (i.e., the pressure of the refrigerant in a high-pressure state) of the refrigeration cycle 22 is increased, and the heating performance is improved.

As shown in a two-dot chain line in FIG. 5, in the case where the device 19 is arranged on the coolant flow upstream side or a coolant flow downstream side of the first coolant cooling heat exchanger 14, the temperature of the device 19 can be adjusted by the coolant.

That is, in the case where the temperature of the device 19 is higher than the temperature of the coolant flowing into the device 19, the device 19 can be cooled. In the case where the temperature of the device 19 is lower than the temperature of the coolant flowing into the device 19, the device 19 can be heated.

Particularly, in the case where the temperature of the coolant, heat of which is radiated in the first coolant cooling heat exchanger 14, is the intermediate temperature of approximately 0 to 10° C., the temperature of the coolant is suited for adjusting a temperature of the battery.

In the case where the device 19 is arranged on the coolant flow upstream side of the first coolant cooling heat exchanger 14, waste heat of the device 19 can be introduced into the first coolant cooling heat exchanger 14. Furthermore, the temperature of the coolant flowing into the second coolant cooling heat exchanger 15 can be restricted from being increased by waste heat of the device 19. Thus, the heat absorbing ability of the second coolant cooling heat exchanger 15 can be secured.

In this embodiment, the first coolant cooling heat exchanger 14 and the second coolant cooling heat exchanger 15 exchange heat between the refrigerant and the coolant. Accordingly, even in the case where the temperature of the air is low, the temperature of the refrigerant, heat of which is exchanged in the first coolant cooling heat exchanger 14 and the second coolant cooling heat exchanger 15, (i.e., the temperature of the refrigerant that is drawn into the compressor 23) can be restricted from being reduced. Thus, the density of the refrigerant drawn into the compressor 23 can be restricted from being reduced.

Furthermore, the ejector 25 supplies the intermediate-pressure refrigerant and the low-pressure refrigerant, the intermediate-pressure refrigerant exchanges heat in the first coolant cooling heat exchanger 14, and the low-pressure refrigerant exchanges heat in the second coolant cooling heat exchanger 15. Accordingly, the refrigerants in two types of the temperature range can absorb heat. Thus, compared to a case where the refrigerant in one type of the temperature range absorbs heat, the refrigerant can efficiently absorb heat. Thus, the heating performance can be restricted from being degraded even at a time of the low outside air temperature.

More specifically, the intermediate-pressure refrigerant absorbs heat of the high-pressure side refrigerant or waste heat of the device 19 in the first coolant cooling heat exchanger 14, and the low-pressure refrigerant absorbs heat from the outside air in the second coolant cooling heat exchanger 15. Thus, the density of the refrigerant can be increased by using heat of the high-pressure side refrigerant or waste heat of the device 19 in the first coolant cooling heat exchanger 14, and heat can reliably be absorbed from the outside air by securing a temperature difference between the refrigerant and the outside air in the second coolant cooling heat exchanger 15.

In this embodiment, the first coolant cooling heat exchanger 14 is connected to at least one of the first coolant circuit C1 and the second coolant circuit C2 in a heating. The first heating mode can be executed by connecting the first coolant cooling heat exchanger 14 to the first coolant circuit C1. The second heating mode can be executed by connecting the first coolant cooling heat exchanger 14 to the second coolant circuit C2.

In the second heating mode, the quantity of heat of the coolant that is after being heated in the coolant heating heat exchanger 16 can be introduced into the first coolant cooling heat exchanger 14. Accordingly, the density of the refrigerant that is drawn into the compressor 23 can be increased by increasing the temperature of the refrigerant that has exchanged heat in the first coolant cooling heat exchanger 14 even at the time of the low outside air temperature. Thus, the heating performance can be improved even at the time of the low outside air temperature.

In the second heating mode, the quantity of heat that is introduced from the second coolant circuit C2 into the first coolant cooling heat exchanger 14 is increased in conjunction with an increase in the heating load. In this way, the heating performance at the time of the low outside air temperature can reliably be improved.

For example, the quantity of heat that is introduced from the second coolant circuit C2 to the first coolant cooling heat exchanger 14 can be adjusted by adjusting the flow rate of the second coolant circuit C2 that flows through the first coolant cooling heat exchanger 14 by the first switching valve 20 and the second switching valve 21. In this case, the first switching valve 20 and the second switching valve 21 constitute an introduced heat quantity adjustment part that increases the quantity of heat introduced from the second coolant circuit C2 into the first coolant cooling heat exchanger 14.

In this embodiment, the first switching valve 20 and the second switching valve 21 switch a connection destination of the first coolant cooling heat exchanger 14 from the first coolant circuit C1 to the second coolant circuit C2 in conjunction with the increase in the heating load in the heating. In this way, the heating performance can appropriately be secured by switching from the first heating mode to the second heating mode in conjunction with the increase in the heating load.

In this embodiment, the first coolant cooling heat exchanger 14 is connected to the first coolant circuit C1 in a cooling. In this way, the cooling performance can be secured by executing the cooling mode.

In this embodiment, the ejector 25 supplies the intermediate-pressure refrigerant and the low-pressure refrigerant, the intermediate-pressure refrigerant exchanges heat in the first coolant cooling heat exchanger 14, and the low-pressure refrigerant exchanges heat in the second coolant cooling heat exchanger 15. Thus, the intermediate-pressure refrigerant and the low-pressure refrigerant can efficiently be supplied.

In this embodiment, the device 19 heats the coolant that flows into the first coolant cooling heat exchanger 14. As a result, the quantity of heat of the coolant that is after being heated in the device 19 can be introduced into the first coolant cooling heat exchanger 14. Thus, the heating performance can be improved even at the time of the low outside air temperature.

According to this embodiment, the radiator 13 causes the coolant to absorb heat by exchanging heat between the coolant that is after being cooled in the second coolant cooling heat exchanger 15 and the outside air. Thus, the heating performance can reliably be exerted by the heat pump operation in which heat is absorbed from the outside air.

In this embodiment, the first switching valve 20 and the second switching valve 21 switch among the cooling mode, the first heating mode, and the second heating mode, reduces the quantity of heat introduced from the coolant that is after being heated in the coolant heating heat exchanger 16 to the refrigerant flowing into the first coolant cooling heat exchanger 14 in the cooling mode in comparison with the case of the second heating mode. In this way, the cooling performance can be secured during the cooling mode.

A bypass path through which the coolant heated in the coolant heating heat exchanger 16 flows while bypassing the first coolant cooling heat exchanger 14 may be provided. In this way, heat that is introduced to the refrigerant flowing through the first coolant cooling heat exchanger 14 may be increased or reduced by adjusting a flow rate ratio between a flow rate of the coolant flowing through the bypass passage and a flow rate of the coolant flowing through the first coolant cooling heat exchanger 14.

In this embodiment, the coolant that circulates through the first coolant circuit C1 absorbs heat from the device 19. As a result, compared to a case where the coolant that circulates through the second coolant circuit C2 absorbs heat from the device 19, the temperature of the coolant flowing into the second coolant cooling heat exchanger 15 can be restricted from being increased by heat of the device 19. Thus, the heat absorbing ability of the second coolant cooling heat exchanger 15 can be secured.

In this embodiment, the temperature of the battery is adjusted by the coolant that has exchanged heat in the first coolant cooling heat exchanger 14. Accordingly, since the temperature of the battery is adjusted by the coolant at the intermediate temperature, the temperature of the battery can favorably be adjusted.

OTHER EMBODIMENTS

The above embodiment can appropriately be combined. For example, various modifications can be made to the above embodiment as follows.

Figure 7:
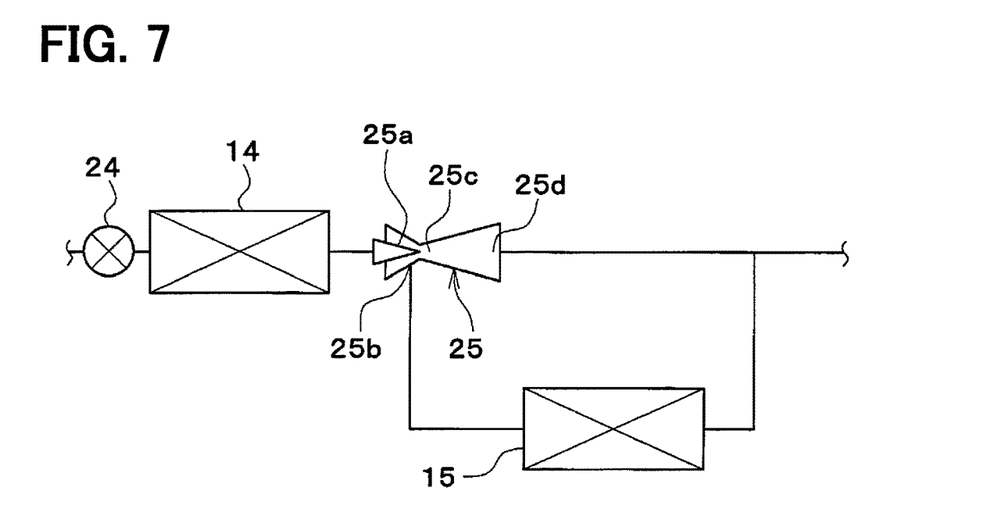
FIG. 7 is a configuration diagram illustrating a main part of a refrigeration cycle in another embodiment.

(1) Various modifications can be made to the refrigeration cycle 22. For example, as shown in FIG. 7, the first coolant cooling heat exchanger 14 may be arranged on the refrigerant flow upstream side of the nozzle portion 25a of the ejector 25.

Figure 8:
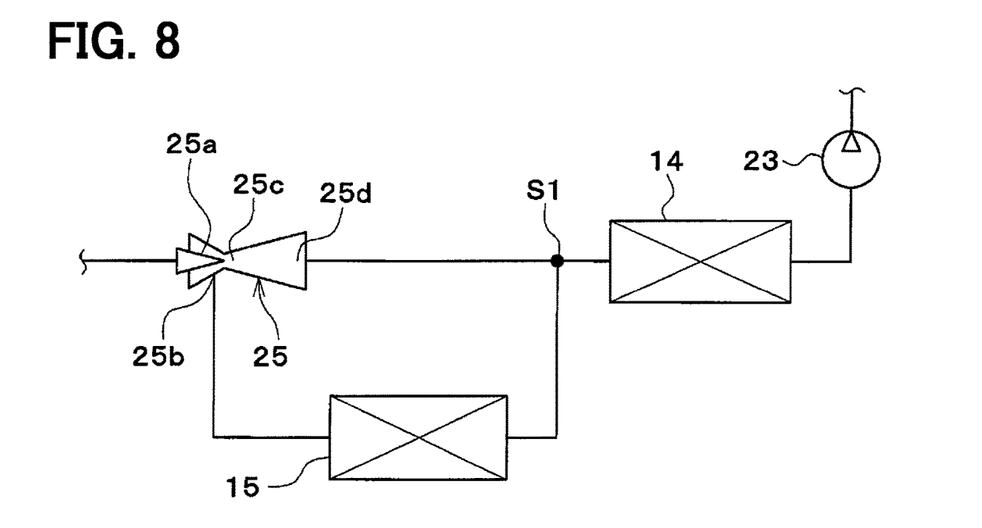
FIG. 8 is a configuration diagram illustrating a main part of a refrigeration cycle in another embodiment.

As shown in FIG. 8, a branch section S1 for dividing the refrigerant to the compressor 23 side and the second coolant cooling heat exchanger 15 side may be provided on a refrigerant flow downstream side of the diffuser section 25d of the ejector 25, and the first coolant cooling heat exchanger 14 may be arranged between the branch section S1 and the refrigerant suction side of the compressor 23.

As in this example, the intermediate-pressure refrigerant that is generated in the expansion valve 24 may exchange heat in the first coolant cooling heat exchanger 14, and the low-pressure refrigerant that is generated in the ejector 25 may exchange heat in the second coolant cooling heat exchanger 15.

Figure 9:
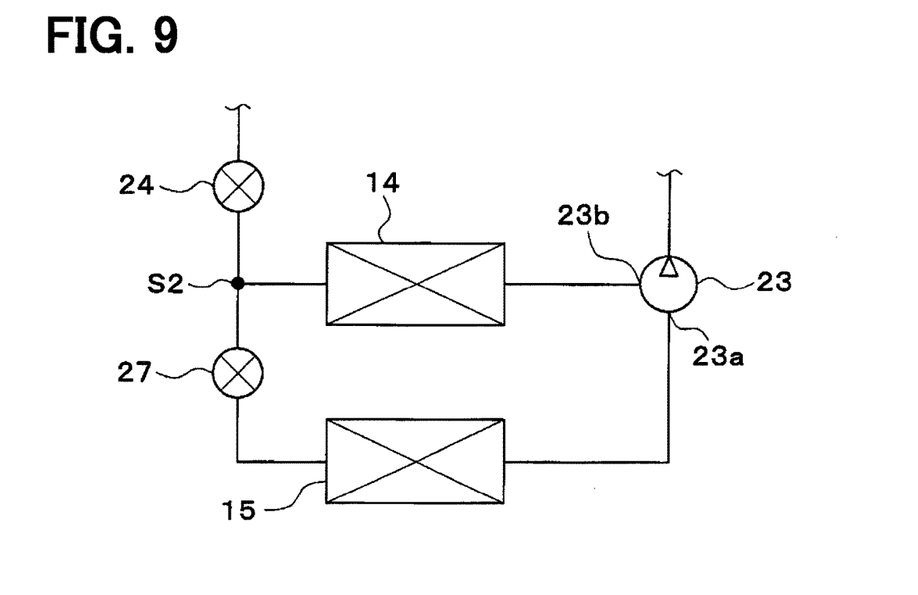
FIG. 9 is a configuration diagram illustrating a main part of a refrigeration cycle in another embodiment.

As shown in FIG. 9, the refrigeration cycle 22 may be a normal refrigeration cycle (i.e., an expansion valve cycle) that does not include an ejector. More specifically, a branch section S2 for dividing the refrigerant to the first coolant cooling heat exchanger 14 side and the second coolant cooling heat exchanger 15 side may be provided on the refrigerant flow downstream side of the expansion valve 24, a second expansion valve (i.e., a pressure reduction part) 27 may be arranged between the branch section S2 and the refrigerant inlet side of the second coolant cooling heat exchanger 15, the refrigerant outlet side of the second coolant cooling heat exchanger 15 may be connected to a suction port 23a of the compressor 23, and the refrigerant outlet side of the first coolant cooling heat exchanger 14 may be connected to an intermediate-pressure port 23b of the compressor 23.

The compressor 23 shown in FIG. 9 is an electric compressor of two-stage pressure boosting type in which two compression mechanisms including: a low-stage side compression mechanism formed by a fixed-capacity-type compression mechanism; and a high-stage side compression mechanism, and an electric motor for rotationally driving both of the compression mechanisms are accommodated in a housing for forming an outer shell thereof.

The suction port 23a of the compressor 23 causes the low-pressure refrigerant to be drawn from the outside of the housing into the low-stage side compression mechanism. The intermediate pressure port 23b of the compressor 23 causes the intermediate-pressure refrigerant of the refrigeration cycle 22 to flow into the housing and merge with the refrigerant in a compression process from low pressure to high pressure.

The compressor 23 of the two-stage pressure boosting type shown in FIG. 9 may be applied to an ejector-type refrigeration cycle that includes the ejector 25.

(2) In the above embodiment, the coolant is used as the heating medium. However, any of various types of media, such as oil, can be used as the heating medium.

A nano fluid may be used as the heating medium. The nano fluid is a fluid in which nanoparticles with particle diameters of nanometer order are mixed. In addition to an operational effect in lowering a freezing point like the coolant (i.e., so-called the antifreeze liquid) using ethylene glycol, the following operational effects can be obtained by mixing the nanoparticles in the heating medium.

That is, an operational effect in improving thermal conductivity in a particular temperature range, an operational effect in increasing heat capacity of the heating medium, an anticorrosive effect of a metal pipe and an operational effect in preventing deterioration of a rubber pipe, and an operational effect in increasing fluidity of the heating medium at an extremely low temperature can be obtained.

Such operational effects change variously in accordance with a particle configuration, a particle shape, a compounding ratio, and an additive material of the nanoparticle.

Accordingly, the thermal conductivity can be improved. Thus, the equivalent cooling efficiency can be obtained by the heating medium in a smaller amount than the coolant using ethylene glycol.

In addition, the heat capacity of the heating medium can be increased. Thus, a cold and heat storage quantity (i.e., stored cold heat by sensible heat) of the heating medium itself can be increased.

Even in a state that the compressor 23 is not actuated, the temperature adjustment that includes cooling and heating of the device by using the stored cold and heat can be performed for a certain duration by increasing the cold and heat storage quantity. Thus, the power of the vehicular heat management system 10 can be saved.

An aspect ratio of the nanoparticle is preferably 50 or more. In this way, the sufficient thermal conductivity can be obtained. It should be noted that the aspect ratio is a shape index that represents a ratio of a height×a width of the nanoparticle.

As the nanoparticle, a nanoparticle that contains any of Au, Ag, Cu, and C can be used. More specifically, as a constituent atom of the nanoparticle, an Au nanoparticle, an Ag nanowire, a carbon nanotube (i.e., a CNT), graphene, a graphite core-shell structured nanoparticle (i.e., a particle body in which a structure such as a carbon nanotube is present to surround the above atom), and an Au nanoparticle containing CNT, or the like can be used.

(3) In the refrigeration cycle 22 of the above embodiment, the chlorofluorocarbon-based refrigerant is used as the refrigerant. However, a type of the refrigerant is not limited to the above, and a natural refrigerant such as carbon dioxide, a hydrocarbon-based refrigerant, or the like may be used.

In addition, the refrigeration cycle 22 of the above embodiment constitutes the subcritical refrigeration cycle in which the pressure of the high-pressure side refrigerant does not exceed the critical pressure of the refrigerant. However, the refrigeration cycle 25 may constitute a supercritical refrigeration cycle in which the pressure of the high-pressure side refrigerant exceeds the critical pressure of the refrigerant.

(4) In the above embodiment, the example in which the vehicular heat management system 10 is applied to the hybrid vehicle is described. However, the vehicular heat management system 10 may be applied to an electric vehicle that does not include the engine and obtains the drive power for running the vehicle from the electric motor for travel, and the like.

(5) In the above embodiment, the heater core 18, which heats the air that is to be blown into the vehicle cabin by exchanging heat between the air to be blown into the vehicle cabin and the coolant, is used as the air-heating heat exchanger (i.e., the air heater). However, as the air-heating heat exchanger (i.e., the air heater), an interior condenser, which heats the air to be blown into the vehicle cabin by exchanging heat between the air to be blown into the vehicle cabin and the high-pressure side refrigerant of the refrigeration cycle 22, may be used.

What is claimed is:

1. An air conditioning device for a vehicle comprising:
a compressor for supplying a high-pressure refrigerant by drawing and discharging a refrigerant;
an air heating heat exchanger for heating air that is to be blown into a vehicle cabin;
a pressure reduction part for expanding and decompressing the high-pressure refrigerant so as to supply an intermediate-pressure refrigerant and a low-pressure refrigerant;
a first low-pressure side heat exchanger for exchanging heat between the intermediate-pressure refrigerant and a heating medium other than the air;
a second low-pressure side heat exchanger for cooling the heating medium by exchanging heat between the low-pressure refrigerant and the heating medium;
a first heating medium circuit through which the heating medium cooled in the second low-pressure side heat exchanger can circulate;
a heating medium-air heat exchanger for causing the heating medium to absorb heat by exchanging heat between the air and the heating medium circulating through the first heating medium circuit;
a high-pressure side heat exchanger for heating the heating medium by exchanging heat between the high-pressure refrigerant and the heating medium; and
a second heating medium circuit through which the heating medium heated in the high-pressure side heat exchanger can circulate, wherein
the first low-pressure side heat exchanger is connected to at least one of the first heating medium circuit and the second heating medium circuit.

2. The air conditioning device for a vehicle according to claim 1 further comprising
a switching valve for increasing a heat quantity that is introduced from the second heating medium circuit to the first low-pressure side heat exchanger in conjunction with an increase in a heating load, wherein
the first low-pressure side heat exchanger is connected to the second heating medium circuit.

3. The air conditioning device for a vehicle according to claim 1 further comprising
a switching valve for switching a connection destination of the first low-pressure side heat exchanger from the first heating medium circuit to the second heating medium circuit in conjunction with an increase in a heating load.

4. The air conditioning device for a vehicle according to claim 1, wherein
the first low-pressure side heat exchanger is connected to the first heating medium circuit.

5. The air conditioning device for a vehicle according to claim 1, wherein
the pressure reduction part has an ejector,
the ejector is configured to draw the refrigerant as a suction refrigerant from a refrigerant suction port by a suction action of a high-speed injection refrigerant that is injected from a nozzle portion reducing the pressure of the refrigerant, and boosts pressure of a mixed refrigerant of the injection refrigerant and the suction refrigerant in a pressure boosting portion,
the intermediate-pressure refrigerant is the refrigerant that is being boosted in the pressure boosting portion, and
the low-pressure refrigerant is the suction refrigerant.

6. The air conditioning device for a vehicle according to claim 1, wherein
the pressure reduction part has an expansion valve for expanding and decompressing the refrigerant and an ejector,
the ejector is configured to draw the refrigerant as a suction refrigerant from a refrigerant suction port by a suction action of a high-speed injection refrigerant that is injected from a nozzle portion reducing the pressure of the refrigerant, which is decompressed in the expansion valve, and boosts pressure of a mixed refrigerant of the injection refrigerant and the suction refrigerant in a pressure boosting portion,
the intermediate-pressure refrigerant is the refrigerant that is decompressed in the expansion valve, and
the low-pressure refrigerant is the suction refrigerant.

7. The air conditioning device for a vehicle according to claim 1 further comprising
a device for heating the heating medium that flows into the first low-pressure side heat exchanger.

8. The air conditioning device for a vehicle according to claim 7, wherein
the device is a heat generating device that generates heat when being operated.

9. The air conditioning device for a vehicle according to claim 7, wherein
the device is a ventilation heat-recovery heat exchanger for recovering heat from air that is discharged from the inside of the vehicle cabin to the outside of the vehicle cabin for ventilation.

10. The air conditioning device for a vehicle according to claim 1 further comprising
a battery that generates heat having a temperature which temperature is adjustable by the heating medium and which heat is transferable in the first low-pressure side heat exchanger.

11. An air conditioning device for a vehicle comprising:
a second heating medium circuit through which a heating medium circulates;
a compressor for drawing and discharging a refrigerant;
a high-pressure side heat exchanger for heating the heating medium by exchanging heat between the refrigerant that is discharged by the compressor and the heating medium that circulates through the second heating medium circuit;
an air heating heat exchanger for heating air by exchanging heat between the heating medium heated in the high-pressure side heat exchanger and the air that is to be blown into a vehicle cabin;
a pressure reduction part for expanding and decompressing the refrigerant that is heat exchanged in the high-pressure side heat exchanger;
a first low-pressure side heat exchanger for exchanging heat between the heating medium and the refrigerant that is expanded and decompressed in the pressure reduction part;
a first heating medium circuit through which the heating medium can circulate;
a second low-pressure side heat exchanger for cooling the heating medium by exchanging heat between the refrigerant that is expanded and decompressed in the pressure reduction part and the heating medium that circulates through the first heating medium circuit; and
a heating medium-outside air heat exchanger for causing the heating medium to absorb heat by exchanging heat between the outside air and the heating medium that is cooled in the second low-pressure side heat exchanger, wherein
the heating medium heated in the high-pressure side heat exchanger is capable of being introduced to the first low-pressure side heat exchanger.

12. The air conditioning device for a vehicle according to claim 11 further comprising:
an air cooling heat exchanger for cooling the air that is to be blown into the vehicle cabin by exchanging heat between the heating medium that is cooled in the second low-pressure side heat exchanger and the air that is to be blown into the vehicle cabin; and
a switching valve, wherein
the switching valve is configured to switch between a heating mode in which the heating medium cooled in the second low-pressure side heat exchanger flows into the heating medium-outside air heat exchanger and a cooling mode in which the heating medium heated in the high-pressure side heat exchanger flows into the heating medium-outside air heat exchanger, and
in the cooling mode, the switching valve is configured to reduce a heat quantity that is introduced from the heating medium heated in the high-pressure side heat exchanger into the refrigerant flowing into the first low-pressure side heat exchanger as compared with in the heating mode.

13. The air conditioning device for a vehicle according to claim 11 further comprising
a device that generates heat, which heat is absorbed by the heating medium circulating through the second heating medium circuit.

14. An air conditioning device for a vehicle comprising:
a compressor for supplying a high-pressure refrigerant by drawing and discharging a refrigerant;
an air heating heat exchanger for heating air that is to be blown into a vehicle cabin;
an expansion valve for expanding and decompressing the high-pressure refrigerant so as to supply an intermediate-pressure refrigerant and a low-pressure refrigerant;
a first low-pressure side heat exchanger for exchanging heat between the intermediate-pressure refrigerant and a heating medium other than the air;
a second low-pressure side heat exchanger for cooling the heating medium by exchanging heat between the low-pressure refrigerant and the heating medium;
a first heating medium circuit through which the heating medium cooled in the second low-pressure side heat exchanger can circulate;
a heating medium-air heat exchanger for causing the heating medium to absorb heat by exchanging heat between the air and the heating medium circulating through the first heating medium circuit;
a high-pressure side heat exchanger for heating the heating medium by exchanging heat between the high-pressure refrigerant and the heating medium; and
a second heating medium circuit through which the heating medium heated in the high-pressure side heat exchanger can circulate, wherein
the first low-pressure side heat exchanger is connected to at least one of the first heating medium circuit and the second heating medium circuit.

* * * * *